(12) United States Patent
Herrmann et al.

(10) Patent No.: US 6,398,303 B1
(45) Date of Patent: Jun. 4, 2002

(54) SEAT

(75) Inventors: Wolfgang Herrmann, Munich; Peter Beerbaum, Allershausen; Josef Leitner, Reichertshofen; Rudolf Lein, Munich; Erhard Moser, Munich; Ralf Dietz, Munich; Juergen Schreiner, Munich; Ludwig Faerber, Munich, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/446,262
(22) PCT Filed: Jun. 22, 1998
(86) PCT No.: PCT/EP98/03810
§ 371 (c)(1),
(2), (4) Date: May 5, 2000
(87) PCT Pub. No.: WO98/58568
PCT Pub. Date: Dec. 30, 1998

(30) Foreign Application Priority Data

Jun. 21, 1997 (DE) .......................... 197 26 410
Jun. 21, 1997 (DE) .......................... 197 26 409

(51) Int. Cl.⁷ .................................................. A47C 1/02
(52) U.S. Cl. ...................................................... 297/314
(58) Field of Search ............................. 297/314, 284.9, 297/452.41; 5/654, 713, 715

(56) References Cited

U.S. PATENT DOCUMENTS

| | | | | |
|---|---|---|---|---|
| 3,477,071 A | * | 11/1969 | Emerson | 5/715 X |
| 3,984,146 A | | 10/1976 | Krestel et al. | |
| 4,711,275 A | * | 12/1987 | Ford et al. | 5/453 X |
| 4,826,247 A | * | 5/1989 | McGrady et al. | 297/314 |
| 5,052,067 A | * | 10/1991 | Thomas et al. | 5/713 |
| 5,116,101 A | | 5/1992 | Sekido | |
| 5,184,365 A | * | 2/1993 | Stafford | 5/715 X |
| 5,320,409 A | | 6/1994 | Katoh et al. | |
| 5,571,005 A | * | 11/1996 | Stoll et al. | 418/268 |
| 5,577,803 A | * | 11/1996 | Guilbaud | 297/314 |

FOREIGN PATENT DOCUMENTS

| | | |
|---|---|---|
| DE | 1 247 138 | 8/1967 |
| DE | 1 950 866 | 4/1971 |
| DE | 30 27 560 A1 | 2/1982 |
| DE | 29 01 208 C2 | 8/1984 |
| DE | 41 37 063 A1 | 5/1993 |
| DE | 195 47 964 A1 | 6/1997 |
| EP | 0 600 135 A1 | 12/1992 |
| EP | 0 780 073 A1 | 12/1996 |
| FR | 1.558.324 | 1/1969 |
| FR | 2 293 332 | 12/1974 |
| FR | 2 472 491 | 12/1979 |
| GB | 508095 | 10/1936 |
| GB | 1 374 997 | 11/1974 |
| JP | 3-220031 A | 9/1991 |
| JP | 3-253435 A | 11/1991 |

* cited by examiner

*Primary Examiner*—Peter R. Brown
(74) *Attorney, Agent, or Firm*—Crowell & Moring LLP

(57) ABSTRACT

The seat cushion of a seat can be tilted about its longitudinal center axis for generating a tilting movement of the pelvis of a seat occupant. For generating the tilting movement, an adjusting element is provided in each of the right and the left area of the seat cushion. The adjusting elements interact to cause an opposite adjusting movement in the vertical direction, whereby the tilting movement of the pelvis is achieved. The adjusting elements are constructed, for example, as liquid-filled rolling bellows, in which case a sliding vane rotary pump changes the volume of the two adjusting elements in a diametrically opposed manner.

11 Claims, 7 Drawing Sheets

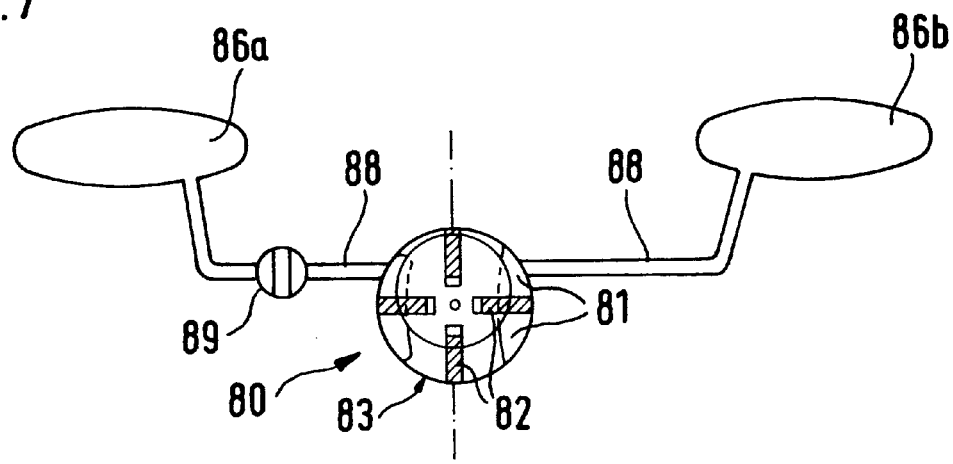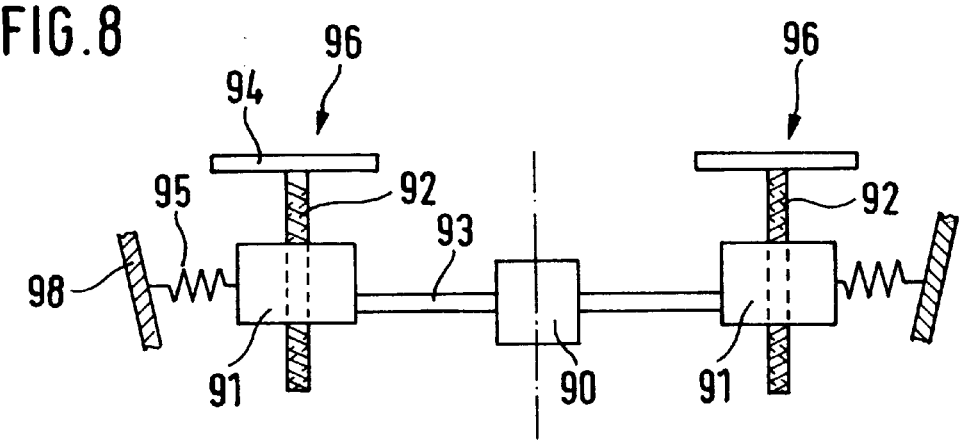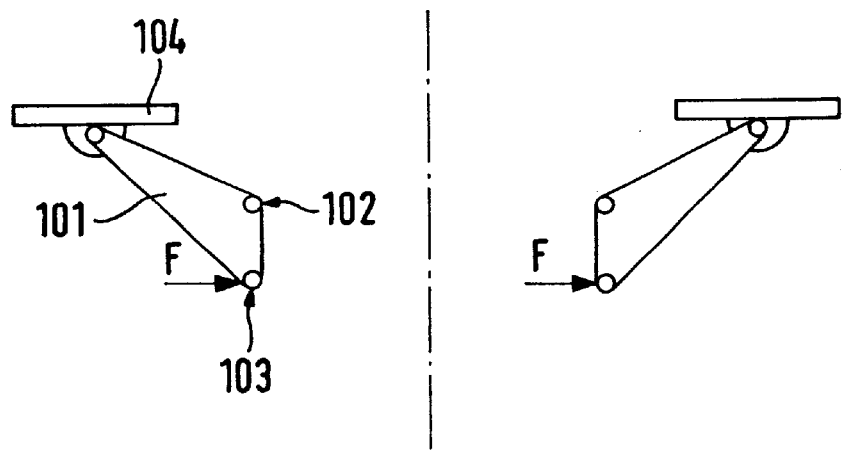

FIG.17

| Stellelement<br>zeitliche Abfolge | 311a | 311b | 311c | 311d |
|---|---|---|---|---|
| 1. | 1 | 0 | 1 | 0 |
| 2. | 1 | 1 | 0 | 0 |
| 3. | 1 | 0 | 1 | 0 |
| 4. | 0 | 0 | 1 | 1 |
| 5. | : | : | : | : |

0: druckloser Zustand

1: druckbeaufschlagter Zustand

SEAT

BACKGROUND AND SUMMARY OF THE INVENTION

This application claims the priority of German patent documents 197 26 409.3, filed Jun. 21, 1997; 197 26 410.7, filed Jun. 21, 1997; and PCT Application No. PCT/EP98/03810 filed Jun. 22, 1998, the disclosures of which is expressly incorporated by reference herein.

The invention relates to a seat that can be tilted about its longitudinal center axis for generating a tilting movement of the pelvis of a sitting person. As used herein, the term "seat" includes all types of seat elements having a seat cushion and optionally a backrest, such as office chairs, bicycle seats, seats in motor vehicles, etc.

German Patent Document DE 195 47 964.5 discloses a seat in which the seat cushion can be tilted about its longitudinal or transverse axis. As a result of these tilting movements with limited small tilting angles, the pelvis of a sitting person, and thus the lumbar movement segments of the spinal column, are moved. In this manner, the intervertebral disks can sufficiently absorb nutrients, even during the otherwise static sitting operation, so that complaints involving the back caused be extended sitting are minimized. For better nourishing the intervertebral disks, particularly a lateral tilting movement of the pelvis is particularly suitable.

German Patent Document DE 33 24 788 A1 discloses an office chair whose seat cushion can be moved up and down and back and forth by means of adjusting elements.

It is an object of the invention to provide a method for generating the described tilting movement of a seat, particularly a vehicle seat.

This and other objects and advantages are achieved by the seat arrangement according to the invention, in which at least one pair of adjusting elements are arranged in mutually opposite areas of the seat cushion and can be controlled to carry out a lifting movement in opposite directions between a lower and an upper position. As the result of the diametrically opposed upward and downward movement, a tilting movement is achieved about a longitudinal or transverse axis of the seat. Care should be taken in this case that the tilting axis is situated as close as possible to the ischial tuberosities of the person sitting on the seat cushion. Also, the adjusting elements must generate only a pure tilting movement; an upward and downward movement of the sitting person, which would result in a sustained impairment of his well-being, must absolutely be avoided.

It is of course apparent that more than only one adjusting element can be provided in each lateral or forward and rearward half of the seat cushion. The adjusting elements, which are assigned to one another in pairs, are preferably controlled reciprocally by way of a common drive. It is also possible to control each adjusting element individually.

According to one embodiment of the invention, the whole seat surface is tilted, which can be implemented particularly in the case of seat constructions with a rigid seat bucket.

Also, the adjusting elements may be arranged between the supporting structure and the cushion part. The supporting structure itself may have a spring-equipped construction.

When the adjusting elements are arranged directly in the cushion, only slight changes are required on the supporting structure of the seat. Because of the narrow distance of the adjusting elements from the ischial tuberosities of the sitting person, a direct transmission of the tilting movement takes place. The adjusting elements may also be arranged in a direct line below the ischial tuberosities. As the result of the cushion layer situated in-between, the movement of the adjusting elements is slightly cushioned and, for increasing the sitting comfort, the tilting movement may be slightly weakened. Care should generally be taken when inserting the adjusting elements that the sitting comfort is impaired as little as possible by the adjusting elements inserted close to the body.

Adjusting elements according to another feature of the invention have a particularly simple construction and can be adapted particularly easily to the respective application. Furthermore, they can be produced at reasonable cost. Elements with flexible walls can, for example, be used as adjusting elements, such as bubbles or bellows made of a rubber-elastic material. Because of the relatively high stresses exerted by the weight of a sitting person, it is recommended that the bubbles, bellows, etc. be reinforced with a fabric insert. Rolling bellows are particularly suitable because they have plane-surface stiff boundaries on the top and bottom side for a linking to the seat structure. With the same effect as the above-mentioned adjusting elements, short-stroke cylinders with a rigid chamber wall can also be used. Such cylinders are distinguished by a correspondingly large diameter while the adjusting path is short and therefore require an installation space which corresponds essentially to the space requirement of bellows-type adjusting elements.

The adjusting elements referred to above may be operated by means of air or a liquid. Air-filled adjusting elements are particularly suitable for the arrangement in the cushion part of the seat cushion, because they adapt to the shape of the ischial tuberosities and do not provide the impression of a hard insert. However, because of the pressure dependence and temperature dependence of the air volume in the adjusting elements, suitable measures are required for controlling the adjusting path of the adjusting elements, for example, by means of a path measurement at the adjusting elements.

If the adjusting elements are operated by a liquid medium, because of the incompressibility of the liquid, a defined and reproducible adjusting path can be implemented, so that the control or automatic control of the adjusting path can take place by way of a simple measuring of the volume flow to and from the adjusting element. However, because of the inflexibility of liquid-filled adjusting elements, an arrangement directly in the cushion close to the ischial tuberosities of a sitting person is possible only with limitations.

The medium for the adjusting elements may be provided in separate working chambers. In this case, when the medium from the first working chamber is transferred into the pertaining adjusting element, it is simultaneously withdrawn from the other adjusting element into the second working chamber, so that the antiphase movement according to the invention is automatically adjusted. Evacuation of the adjusting element situated in its raised position is promoted by the weight of the sitting person. The working chambers as well as the drive for the volume displacement may advantageously be arranged outside the immediate sitting area, so that only a small space is required within the seat or the seat cushion.

According to another feature of the invention, the tilting movement can be implemented, for example, by a double-acting pneumatic or hydraulic cylinder. In the case of a liquid working medium, a defined and reproducible working stroke of the adjusting elements can be achieved by measuring the piston path. Instead of the working chambers formed in the cylinder, bellows-shaped working chambers may also be provided.

Another embodiment of the invention has no separate working chambers for the medium. As a result, a particularly simple construction is achieved, while the installation space is very small. The medium is pumped back and forth directly between the two adjusting elements, without any separate reservoir from which the medium is taken or into which the medium is returned. Thus, a "closed pendulum system" is obtained with a particularly low filling amount of medium.

Generally all known embodiments of pumps can be used as pressure medium pumps. When a sliding vane rotary pump is used, it is an advantage in conjunction with a liquid medium that, per revolution of the pump, a measurable and largely constant volume is delivered. By detecting the rotational speed of the pump, the adjusting elements can be controlled or automatically controlled in a simple manner. The entering of a constant center position of the adjusting elements is also easily possible. By the corresponding automatic control of the rotational speed of the pump, the course of the adjusting movement can be controlled over time.

In principle, instead of a sliding vane rotary pump, a piston pump can be used which, when a liquid medium is used, also delivers a measurable volume flow. Because of the occurring pulsations, the use of piston pumps is limited to smaller individual volumes. Optionally, multipiston pumps can be used.

In a further embodiment of the invention at least two adjusting elements are arranged above one another on two opposite areas of the seat cushion, each being able to carry out a defined adjusting path between the two defined and reproducible conditions "adjusting element completely evacuated" and "adjusting element completely filled". By the corresponding filling or evacuating of the individual adjusting elements, adjusting heights can be entered which differ in steps. According to the invention, this is possible without any path measurement, which would require a sensor system, with particularly low expenditures, for example, by means of a simple control by way of valves which generate only the two conditions "pressureless" and "full operating pressure". The number of adjusting elements arranged above one another determines the number of the possible adjusting positions.

Elements with flexible walls, such as bubbles or bellows made of a rubber-elastic material, are preferably used as adjusting elements. Because of the relatively large stresses exerted by the weight of a sitting person, it is recommended that the bubbles, bellows, etc. be reinforced with a fabric insert. When bubble-type adjusting elements are used, a very low space requirement is obtained because the constructional height of the adjusting elements in the starting condition is determined only by the sum of their wall thicknesses. In a special manner, rolling bellows are also suitable because they have plane-surface stiff boundaries on the top and bottom side for the linking to the seat structure. With the same effect as the above-mentioned adjusting elements, short-stroke cylinders with a rigid chamber wall can also be used. Such cylinders are distinguished by a correspondingly large diameter while the adjusting path is short and therefore require an installation space which corresponds essentially to the space requirement of bellows-type adjusting elements.

In the case of two adjusting elements arranged above one another, three defined adjusting heights are obtained: The pressureless condition of both adjusting elements marks the lower position whose height, for example, in the case of bubble-type adjusting elements, is determined only by the sum of the wall thicknesses of the two bubbles. A center position is obtained by the admission of pressure to one of the two adjusting elements, while the second adjusting element remains pressureless. Finally the upper position can be entered in a defined manner by the admission of pressure to both adjusting elements. If the two adjusting elements have the same construction, a center position can be entered which is situated precisely in the geometrical center between the lower and the upper position. As the result of an alternating control in the opposite direction of the adjusting elements arranged in pairs in the two seat cushion areas, a tilting of the pelvis is achieved about the longitudinal or transverse axis of the seat. Naturally, the invention includes embodiments with more than two adjusting elements arranged above one another.

In the case of liquid-filled adjusting elements, the adjusting path (assuming a corresponding design of the adjusting element) is largely independent of the stressing of the adjusting element and of the ambient temperature. Thus, reproducible adjusting paths can be achieved in a particularly simple manner.

In contrast, pneumatic adjusting elements, as a rule, have a simpler construction and are easier to control than liquid-filled adjusting elements. Because of the compressibility of the gaseous medium and its considerable temperature dependence, the (maximal) adjusting path cannot be reproduced however. It is therefore suggested to automatically limit the adjusting path of the adjusting element by an additional device on the adjusting element. Thus, irrespective of the stressing of the pneumatic adjusting element, one defined maximal adjusting path respectively is maintained if the adjusting element is acted upon by an internal pressure which is higher than would be necessary because of the effective inner surface of the adjusting element and the respective loading by a sitting person. This ensures that a constant adjusting path is maintained without any additional measures, such as a path measurement.

According to another feature of the invention, path limitations are provided in the interior of the adjusting element. These path limitations consist preferably of a flexible, non-ductile material. In the case of adjusting elements with walls made of a plastic material, they can be welded directly to the adjusting element during the manufacturing. This results in a particularly simple construction and in a low-cost manufacturing.

As an alternative—viewed in the adjusting direction—opposite wall sections, in the case of adjusting elements made of a plastic material, can be welded in sections to one another so that, as the result of these welded connections, a path limitation is also achieved (comparable with quilting, for example, in the case of air mattresses). In addition, exterior path limitations are naturally also possible, in which case the partial or surroundingly ring-shaped looping around the adjusting element takes place, for example, by straps made of a flexible and non-ductile material. Preferably, the path limitation on the outer circumference of the adjusting element is additionally fixed in order to reliably prevent a sliding-off in the pressureless condition of the adjusting element.

When a gaseous pressure medium is used to operate the adjusting elements, it is essential that a sufficiently high pressure be available in order to be able to reliably maintain respective constant adjusting paths (and therefore defined limited tilting angles) in conjunction with the path limitation according to the invention independently of the stressing by the sitting person. The adjusting elements can be controlled by way of simply constructed valves, without need for a sensor system for evaluating the respective existing adjusting height. In addition, in the case of several seats (for example, in a vehicle), a central air feed with a single pressure source is sufficient.

In a further embodiment of the invention, a shut-off valve can be provided between the adjusting elements (for example, the two seat halves) to prevent reliably an exchange of the medium between the adjusting elements. The shut-off valve is activated by the user when the device for generating a tilting movement is switched off and the seat cushion is to be fixed in a "slanted" position (the adjusting elements are "locked" at different heights). The shut-off valve prevents a slow flowing-over of the medium, for example, as the result of leakage losses in a pump. Such an application can be considered, for example, for seat users who require a slanted position of the seat cushion for orthopaedic reasons.

The tiltable seat according to the invention can be operated by means of a motor-operated adjusting drive, for example, an electric motor or by means of a pressure medium. Electric motors, in particular, are distinguished by a low space requirement and a simple controllability. The motor-operated adjusting drives may be combined with all known transmission elements, such as rotatory or linear transmissions, eccentrics, toothed racks, etc. In the case of the pressure medium drive, hydraulic media are preferred because of the better automatic control possibilities and the higher working pressures.

In most cases, direct implementation of the adjusting movement by way of lever arms requires a transmission for the power ratio; rotatory as well as linear transmissions are conceivable, depending on the manner of generating the power.

In another embodiment of the invention, spindle drives are driven by a rotary motor and convert its rotating movement into a vertical movement. Preferably, a common drive shaft is to be provided for the adjusting elements arranged in pairs. This also applies to eccentric drives and lifting linkages.

Height changes in the region of the ischial tuberosities of the sitting person can be achieved by means of wedge-shaped elements, particularly wedge-shaped disks, which are rotated relative to one another. In this case, the wedge-shaped disks can be disposed with respect to one another by way of rolling bodies for reducing friction.

In still another embodiment, the seat cushion is tilted by an adjusting element applied to one side. Such tilting is particularly appropriate in those seats whose seat cushion has a rigid "seat bucket" which can be tilted as a whole about a defined center axis. Tilting by way of an adjusting element applied to one side can also be used, however, in seats with a spring core substructure, in which case, tilting takes place about an axis approximately in the center of the seat cushion, automatically. The adjusting element is preferably arranged outside the supporting structure of the seat cushion. An arrangement of the adjusting element between the supporting structure and the cushion part is also conceivable. All above-indicated embodiments can, for example, be used as adjusting elements.

As mentioned above, when the adjusting elements are actuated by a liquid medium, advantages occur with respect to the control or automatic control of the adjusting path, because, by way of measuring the volume flow, a defined adjusting path can be achieved.

According to yet another embodiment of the invention, a constant center position can be achieved, irrespective of the sitting position or the body weight of the seat user, by means of a bubble-type adjusting element.

Certain pump configurations (for example, sliding vane rotary pumps) emit a fixed number of measurable pulses with each revolution, with a linear relationship between the number of pulses and the delivered amount of liquid. However, within defined limits, the delivered liquid flow is a function of various parameters, such as the driving direction of the pump, pumping or suction operation, the pressure level against which the delivery or the suction takes place, etc.

In the process according to the invention, in a closed system, in which the pump conveys a defined liquid volume back and forth between two adjusting elements 1 and 2, a starting condition is first defined in which one of the adjusting elements (such as the adjusting element 1) is just completely evacuated. This condition can be clearly determined by means of a steep pressure drop in the pump which occurs when the adjusting element is evacuated. Hereinafter the latter condition will be called the initial value L12, (wherein L="adjusting element empty", and 12="pumping direction from adjusting element 1 into adjusting element 2"). Subsequently, the pump delivers the liquid back into the previously evacuated adjusting element 2, until a fictitious center position of the adjusting element 2 (and thus also of the adjusting element 1) has been reached. In this case, the pump is controlled by means of a pulse number which is based on a preset value, so that, for the first cycle after the start of the operation of the system, under certain circumstances, first an incorrect ("slanted") center position may still be generated. Then, the adjusting element 2 is completely filled. The measurement for complete filling will be the pressure drop in the now completely evacuated adjusting element 1 (final value V12, wherein V="adjusting element full"). The number of pulses N12 between the values L12 and V12 delivered by the pump is filed in a data memory.

In the same manner, the final value V21 is determined for the reverse pumping direction from the adjusting element 2 into the adjusting element 1. The starting point for such counting is the initial value L21 (corresponding to the value V12). Thus, a pulse number N21 is obtained for the second pumping direction.

After the first complete cycle, with N12 and N21, measuring numbers are now available which indicate how many pulses are required in each case for the complete pumping over of the liquid between the two adjusting elements. The measuring numbers N12 and N21 are multiplied by previously empirically determined factors F12 and F21, which are constant for a particular construction of a unit consisting of the seat and the adjusting elements. Since, as a rule, the factors F12 and F21 deviate only slightly from one another, in a simplified technique, a uniform factor F can also be used for the two pumping directions.

By means of the product F12·N12 or F2·N21, in the subsequent cycle, the exact geometrical center position of the two adjusting elements is entered. In this case, it is significant that such center positioning can be achieved without any direct path measurement, so that the process according to the invention is distinguished by very low expenditures. By means of the measuring numbers N12 and N21, the respective loading of the seat by the occupant is taken into account, so that, already after a single initialization cycle (in which the values N12 and N21 are determined), the geometrical center position of the adjusting elements is precisely maintained.

The loading of the seat is significantly influenced by the seat user's body weight and the contact surface between the seat user and the seat cushion. In addition, the sitting position of the seat user also influences the values N12 and N21, depending on whether the right and the left or the forward and the rearward seat half is loaded more. Thus, according to the process of the invention, the systems adapts itself not only to different seat users but also dynamically to changing sitting positions of one and the same seat user.

Other objects, advantages and novel features of the present invention will become apparent from the following detailed description of the invention when considered in conjunction with the accompanying drawings.

BRIEF DESCRIPTION OF THE DRAWINGS

FIGS. 4 to 7 are views of embodiments of fluid-operated adjusting elements;

FIGS. 8 to 10 are views of embodiments of "mechanically" driven adjusting elements;

FIG. 17 is a table-type control diagram of an arrangement of adjusting elements according to FIG. 16.

DETAILED DESCRIPTION OF THE DRAWINGS

Figure 1:
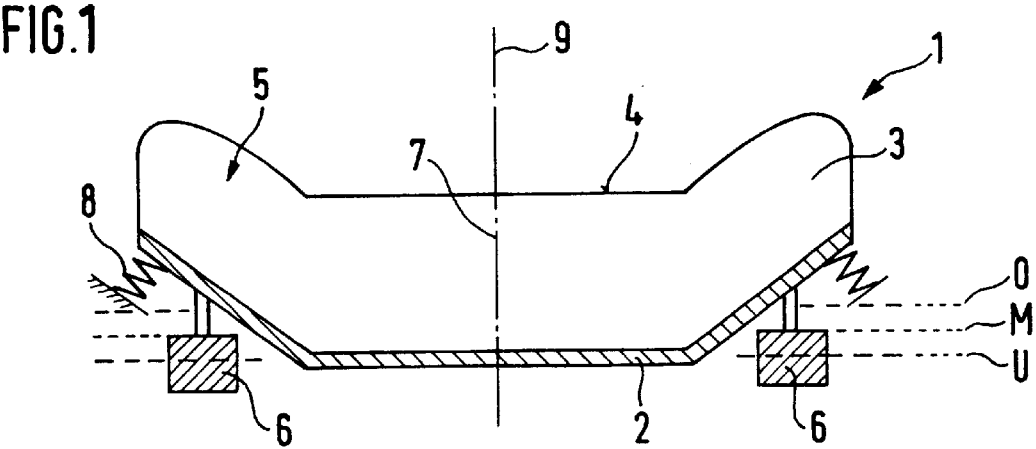
FIG. 1 is a view of a seat cushion with adjusting elements arranged outside the supporting structure.

FIG. 1 illustrates a seat cushion 1 which is composed of a supporting structure 2 and a cushion part 3. The center part of the seat cushion 1 is constructed as a seat surface 4, while the lateral areas 5 are bead-shaped. Adjusting elements 6, which are in each case situated on the exterior on the right and the left, are applied to the bottom side of the supporting structure 2. These adjusting elements 6 can take up a center position M as well as an upper and a lower position O and U. Since the supporting structure 2 is elastically disposed within certain limits with respect to a seat frame (not shown) or a seat suspension (suspension 8), during a movement of the right and the left adjusting elements 6 in the opposite direction, a tilting movement of the seat cushion is generated about a tilting axis 7, which is situated in the longitudinal center plane 9 of the seat cushion 1.

Figure 2:
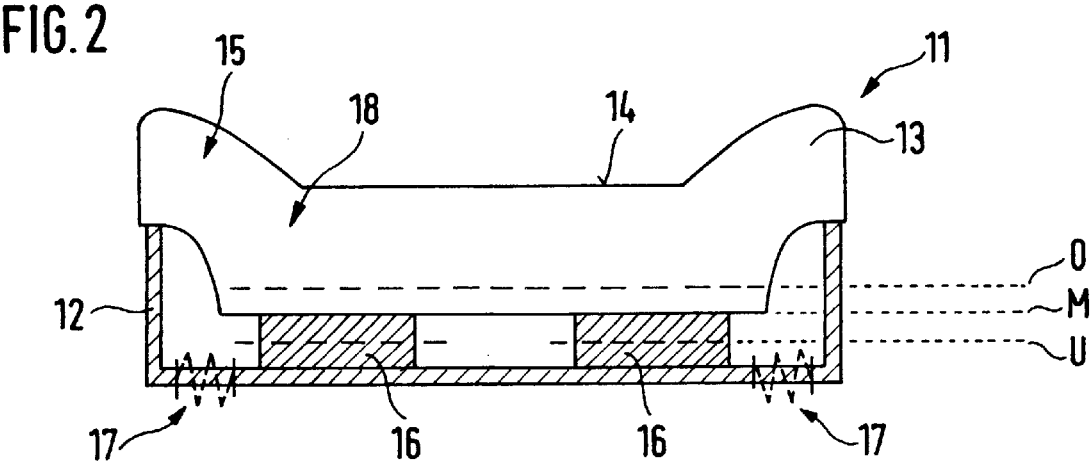
FIG. 2 is a view of a seat cushion with adjusting elements between the supporting structure and the cushion part.

FIG. 2 illustrates a seat cushion 11, in which the adjusting elements 16 are arranged between the supporting structure 12 and the cushion part 13. Mainly flat-construction adjusting elements 16 are suitable for this purpose. The individual positions which can be taken up by the adjusting elements 16 are marked M, O and U. Transition areas 18 between the beads 15, which are relatively rigidly connected to the supporting structure 12, and the seat surface 14 permit a compensation of the tilting movements caused by the adjusting elements 16. The supporting structure 12, in turn, may be equipped with springs, which is illustrated by means of the springs 17 shown by a broken line in FIG. 2.

Figure 3:
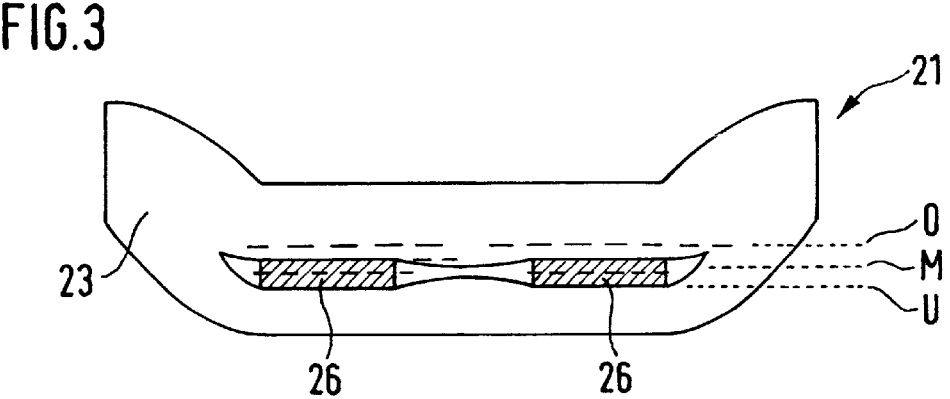
FIG. 3 is a view of a seat cushion with adjusting elements inserted in the cushion part.

FIG. 3 illustrates another possibility of inserting adjusting elements 26 in a seat cushion 21 which is again composed of a supporting structure (not shown) and a cushion part 23. The adjusting elements 26 are preferably constructed as air-filled bubbles or flat-construction rolling bellows. They can be inserted or glued into the cushion part or can be surrounded in a foamed manner by the material of the cushion part 23.

Figure 4:
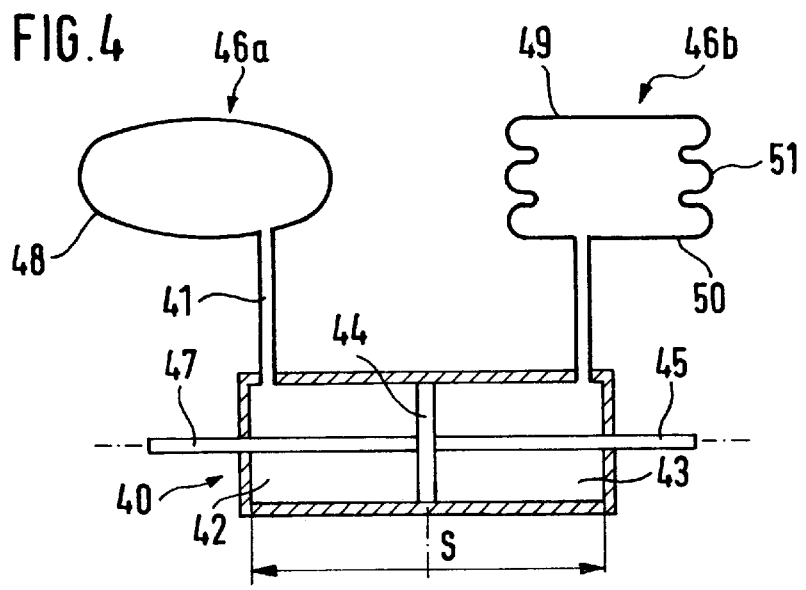

FIGS. 4 to 7 illustrate different possibilities of the drive of adjusting elements by way of a liquid or gaseous medium FIG. 4 illustrates a double-acting cylinder 40 which controls adjusting elements 46a and 46b by way of connection lines 41. The cylinder has a first and a second working chamber 42 and 43 which are separated from one another by means of a piston 44. The piston can be displaced by way of a piston rod 45, the volumes of the two working chambers 42 and 43 increasing and decreasing in an opposed manner. A second piston rod 47 ensures the volumetric uniformity in the two working chambers 42 and 43. With the linear movement of the piston 44 (path s), the filling ratio of the left and the right adjusting element 46a, 46b is also continuously changed.

Different embodiments are shown as adjusting elements 46a and 46b in the manner of examples on the left and the right. (Naturally, in the case of a constructed system, adjusting elements are to be provided which are identical on both sides.) The adjusting element 46a is constructed as a bubble-shaped structure with walls 48 which are flexible on all sides; while the adjusting element 46b is formed by a rolling-bellows-type structure with an upper and a lower cover plate 49 and 50 as well as rubber-elastic rolling bellows 51.

Figure 5:
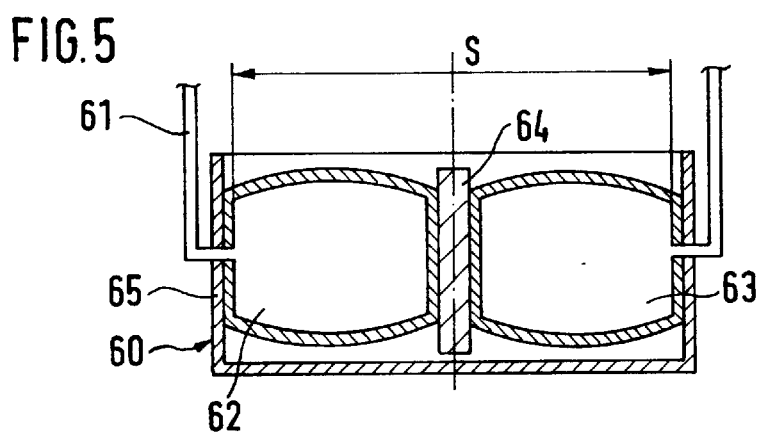

In the embodiment of FIG. 5, the working chambers 62 and 63 are accommodated in a housing 60 and are formed by bubbles or rolling bellows which are connected by way of connection lines 61 to adjusting elements which are not shown. The housing 60 guides a slide 64 which can be displaced in parallel to the lateral boundary walls 65 of the housing 60 (path s).

Figure 6:
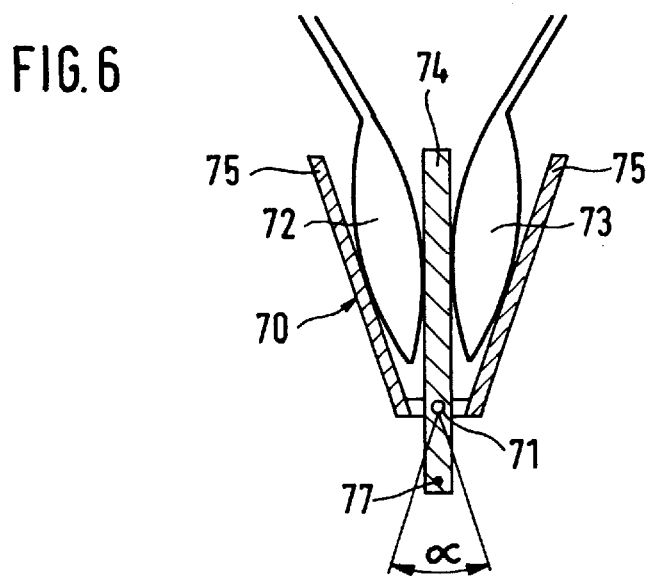

In an alternative embodiment according to FIG. 6, the two working chambers 72 and 73 are arranged in a housing 70 with an approximately V-shaped cross-section. A swivel plate 74 is swivellably disposed (swivelling axis 71) on the intersection line of the two boundary walls 75 of the housing 70, so that the plate 74 can be adjusted when force is introduced, for example, at the application point 77 or when a torque is introduced at the swivelling axis 71 (swivel angle α).

According to FIGS. 4 to 6, the adjusting elements are in each case adjusted in a diametrically opposed manner by way of mutually separate fluid circuits. The adjustment can take place, for example, by way of a reciprocating linear drive, an eccentric drive, etc. When liquid media are used, irrespective of the load, almost constant adjusting paths are achieved at the adjusting elements. In all cases, a reservoir (working chambers 42, 43 and 62, 63 and 72, 73) is provided by way of which the pertaining adjusting elements are filled and evacuated.

In contrast, the adjusting elements 86a and 86b according to FIG. 7 are directly connected with one another by way of a sliding vane rotary pump 80 and are acted upon by pressure in opposite directions. The sliding vane rotary pump 80 has several chambers 81 which deliver a defined chamber volume. The individual chambers 81 are separated from one another by way of radially movable slides 82 and are sealed with respect to the pump housing 83. Because of the arrangement illustrated in FIG. 7, separate chambers for providing working medium are not required, whereby a particularly compact construction is achieved. The sliding vane rotary pump 80 can be driven, for example, by an electric motor whose rotational speed is detected by way of a Hall sensor, so that, when liquid media are delivered, the adjusting path can be controlled or automatically controlled on the adjusting elements 86a and 86b in a simple manner.

In one of the connection lines 88, a shut-off valve 89 is provided which acts in both flow directions and by means of which an exchange of the medium between the two adjusting elements 86a and 86b can be prevented in order to achieve a static "slanted position" of the seat cushion of the vehicle seat. The slanted position is achieved, for example, by briefly energizing the valve 89, which blocks in the currentless condition, so that a leakage flow occurs via the leakage gap of the sliding vane rotary pump 80, under the force of the weight (and possibly of an intentionally influenced weight distribution of the seat user), and the desired wanted position is adjusted.

FIG. 8 illustrates adjusting elements 96 which each have a spindle nut 91 and a spindle 92. Both adjusting elements 96 are driven by way of a drive shaft 93 by an electric motor 90. The spindle nuts 91 transform the rotating movement of the shaft 93 into a vertical movement of the plate-shaped transmission elements 94. The spindle nuts 91 are supported relative to the seat structure 98 by springs 95. The "spindle nut 91—spindle 92" pairings have one right-hand or left-hand thread respectively for each seat cushion half in order to achieve, during the rotation of the shaft 93, a movement of the two transmission plates 94 in opposite directions.

FIG. 9 shows a lever arrangement 101, which introduces force directly to transmission plates 104 arranged directly below the ischial tuberosities of a sitting person, with a sufficiently thick layer of the cushion material of the seat cushion ensuring a high sitting comfort. The levers 101 are supported by bearings 102 on the seat structure. A force can be applied at the points 103 (arrows F) to change the height of the transmission plates 104, which are arranged in a hinged manner on the end section 105 of the lever 101, in opposite directions.

Figure 10:
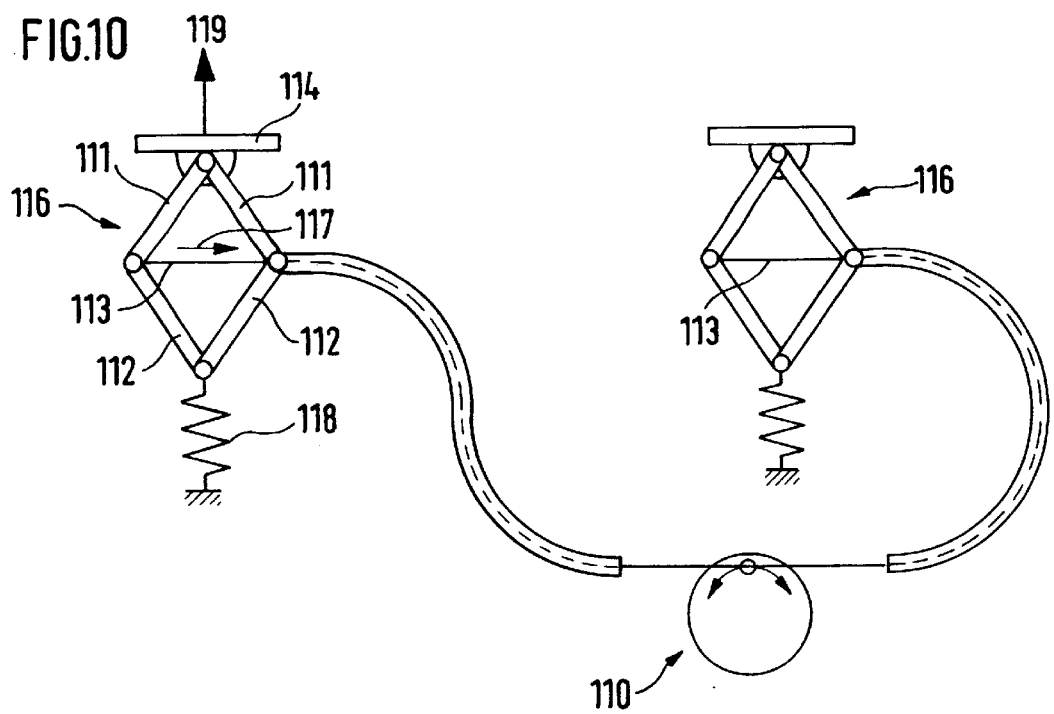

The adjusting elements 116 according to FIG. 10 are constructed as scissor-type lifting linkages. They consist of upper and lower scissors 111 and 112 which are moved by way of a cable pull 113. When the cable pull 113 is shortened on the left adjusting element 116 (arrow 117), the scissors 111 and 112 are changed in the direction of their folded-together position, so that the transmission plate 114 is displaced upward (arrow 119). The cable pull 113 is adjusted by a reciprocating drive 110 which generates movements in opposite directions at the two adjusting elements 116. In parallel to the lifting of the right adjusting element 116, the left adjusting element 116 is changed in a diametrically opposed manner by the weight of the sitting person and/or a spring 118 into a lowered position.

Figure 11:
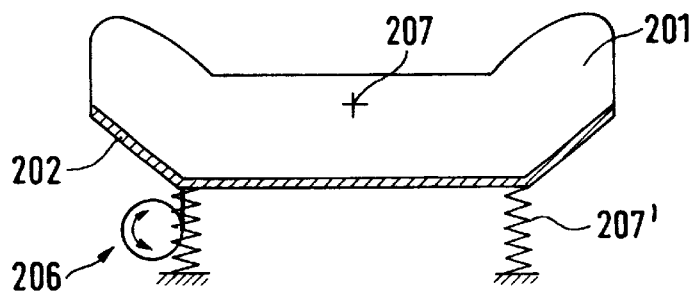
FIGS. 11, 12 are views of an arrangement of a single adjusting element on a seat cushion.
Figure 12:
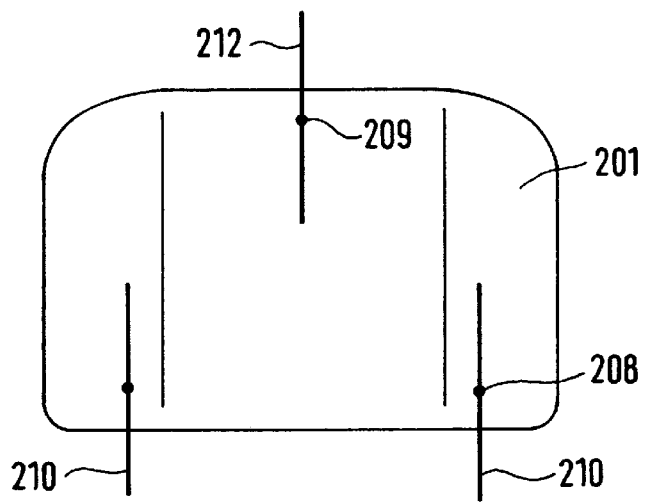

FIGS. 11 and 12 illustrate a seat cushion 201, in which an individual adjusting element 206 is applied only to one side. In the illustrated embodiment, the adjusting element 206 consists of an eccentric drive in the left rearward area of the seat cushion 201. The seat cushion 201 has a rigid supporting structure 202, which is supported by springs 207 and by rearward linking points 208 (FIG. 12) on two rearward seat rail sections 210, and a forward linking point 211, on a central forward seat rail section 212. As a result of this "three-point bearing", with the illustrated adjusting movement introduced on one side by way of the eccentric drive 206, the seat cushion 201 can be tilted about the tilting axis 207.

Figure 13:
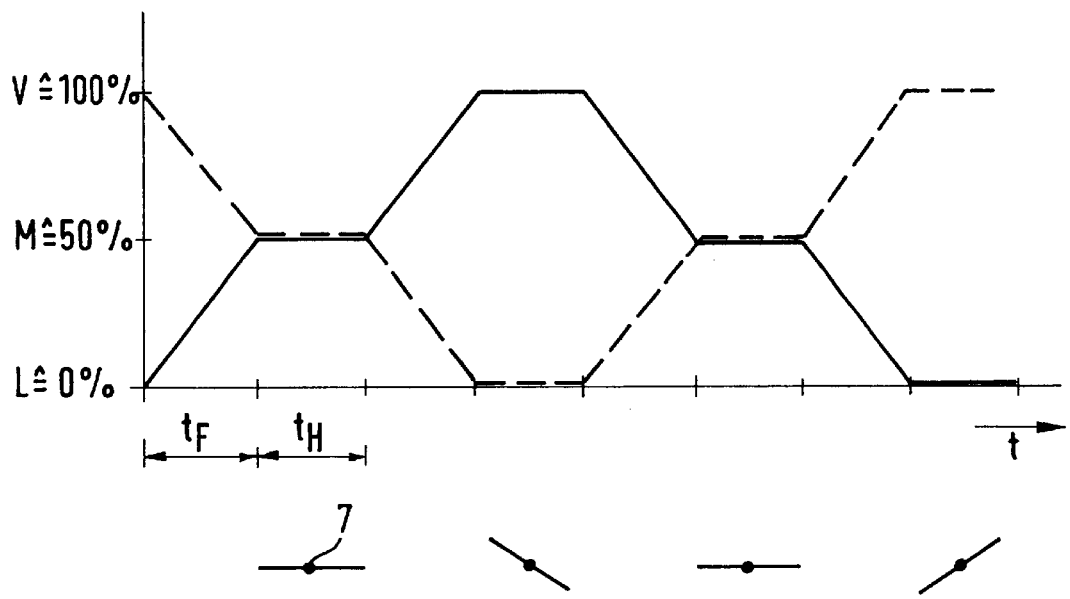
FIGS. 13, 14 illustrate the determination of the values N12 and N21 for the correct centering of liquid-filled adjusting elements.
Figure 14:
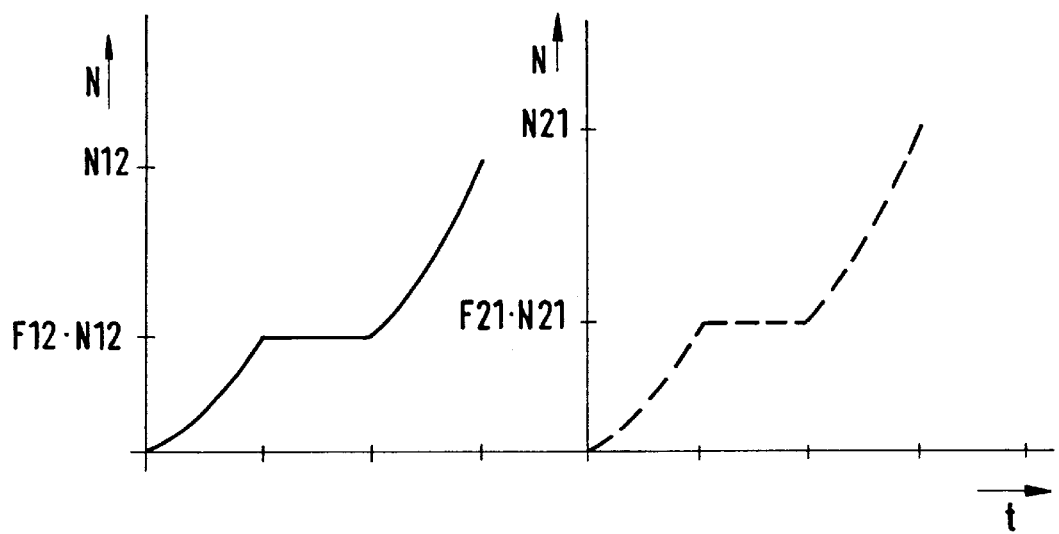

FIGS. 13 and 14 illustrate the process according to the invention for entering a geometrical center position in the case of liquid-operated adjusting elements, as, for example, the adjusting elements 86a and 86b in FIG. 7.

A solid line in FIG. 13 shows the adjusting path s of the first adjusting element 86a over the time t, while the adjusting path s of the second adjusting element 86b, indicated by a broken line, extends in antiphase thereto. As the result of the illustrated path courses, the tilting movement of the seat cushion is generated which is described in Patent Application 195 47 964.5, which tilting movement causes a movement of the lumbar sections of the spinal column of a sitting person. The individual phases of the tilting movement of the seat cushion about the tilting axis 7 are symbolically illustrated in FIG. 13.

Starting from an unfilled condition L, the adjusting element 86a is first filled with liquid to such an extent (filling duration $t_F$) that a center position M (half of the maximal adjusting path) is adjusted. After a holding period $t_H$, the adjusting element 86a is completely filled with the liquid (condition V). Subsequently, the filling ratio is reduced to such an extent that the center position M is adjusted again, in order to again enter in the last section of the cycle the starting condition L. In the selected example, the filling and holding duration $t_F$ and $t_h$ are identical during the individual phases of the cycle and are constant during the duration of the cycle. For example, $t_F$ and $t_M$ amount to 10 seconds, so that a cycle duration of a total of 80 seconds is obtained.

FIG. 14 illustrates over the time t the number N of the pulses occurring at the pump, such as a sliding vane rotary pump 80. In the first half of the cycle, the pump 80 delivers the liquid from the adjusting element 86a into the adjusting element 86b (solid line in the left part of the diagram); while the pumping direction extends inversely in the second cycle half (broken line in the right part of the diagram).

Starting from a pulse number N12 determined in the preceding cycle, which corresponds to the complete filling of the adjusting element 86a, the adjusting element 86a is filled at the beginning of the new cycle to the value F12·N12. As the result, the geometrical center position M of the adjusting element 86a is achieved. Subsequently, the adjusting element 86a is filled completely. (A significant pressure drop in the pump 80 is used, as an indicator of complete filling since such a pressure drop occurs simultaneously with complete evacuation of the adjusting element 86b.)

In the second half of the cycle, the liquid is withdrawn again from the adjusting element 86a, with a corresponding dwell time in the center position M. This evacuating of the adjusting element 86a is controlled by filling of the adjusting element 86b (broken line), in which case a value N21 taken over from the previous cycle in conjunction with the specific factor F21 ensures the maintaining of the center position M in the same manner.

The factors F12 and F21 (in the present example, about 0.4) are determined by the manufacturer and do not significantly change during the life of the seat system.

In a subsequent cycle, which follows the sequence illustrated in FIGS. 13 and 14, the newly determined values N12 and N21 which were required for the complete filling of the two adjusting elements 86a, 86b, are used; that is, in each successive cycle, the values N12 and N21 are replaced by actual values from the preceding cycle.

Figure 15:
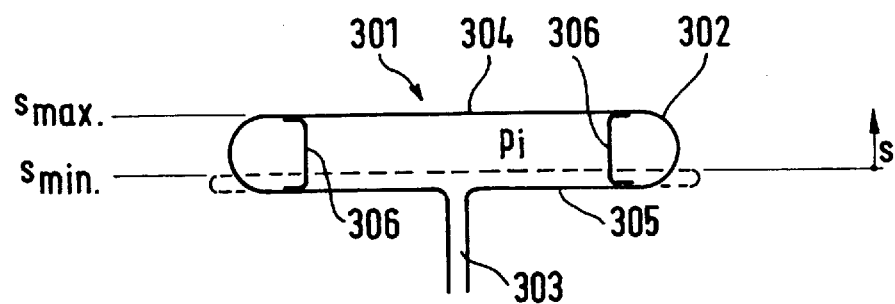
FIG. 15 is a schematic representation of another adjusting element according to the invention.

FIGS. 15 to 18 show a further development of the invention. FIG. 15 illustrates an adjusting element 301 with flexible walls 302 (FIG. 15) and an air feed 303. In the pressureless condition of the adjusting element 301 (broken lines), the upper and the lower wall 304 and 305 of the adjusting element are situated directly upon one another. In the condition in which pressure is admitted (solid lines), the two walls 304 and 305 are spaced from one another and form a bubble-shaped body. In the interior of the adjusting element 301, two webs 306 are provided which are welded to the walls 304 and 305 of the adjusting element 301. The webs 306 consist of a flexible but non-ductile plastic material and form a path limitation in the direction of the adjusting path s. By way of the air feed 303, a constant internal pressure $p_i$ is provided whose force effect outweighs a maximal exterior weight load. As a result of the webs 306, according to the invention, also in the case of a lower load G, the adjusting path s is limited to the value $s_{max}$. The pressureless condition of the adjusting path 301 represents the starting path $s_{min}$, whose amount is determined by the wall thickness of the walls 304 and 305.

Figure 16:
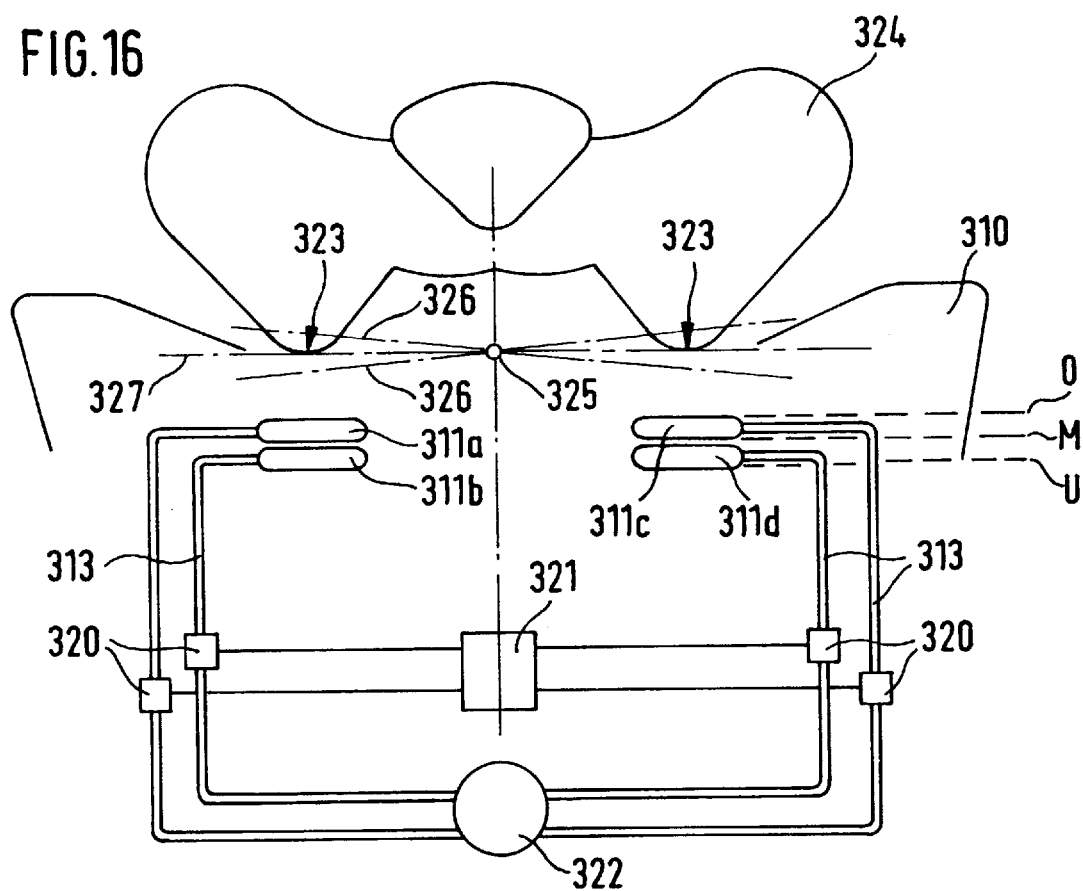
FIG. 16 is a view of an arrangement of adjusting elements of the invention according to FIG. 15 in a vehicle seat.

According to FIG. 16, two adjusting elements 311$a,b$ and 311$c,d$ respectively, which are arranged above one another, are arranged per seat half in a seat cushion 310 of the vehicle seat. The individual adjusting elements 311$a$ to 311$d$ have a construction which is comparable to the adjusting element 301 and are connected with a pressure source 322, by way of air feeds 313 and valves 320. The valves 320 are controlled by way of a control device 321. The adjusting elements 311$a$ to 311$d$ are arranged in the seat cushion 310 in each case below the ischial tuberosities 323 of the pelvis 324 of a person sitting on the seat cushion 310.

By way of the valves 320, the adjusting elements 311$a$ to 311$d$ are either switched pressureless or are acted upon by the operating pressure $p_i$. Correspondingly, the adjusting elements 311$a$ to 311$d$ take up two exactly defined adjusting levels $s_{min}$ and $s_{max}$ (analogous to FIG. 15). By mans of the arrangement of two adjusting elements 311$a,b$ and 311$c,d$ above one another, by way of the valves 320 and the control device 321, three positions O, M and U can be entered per seat cushion side. In the case of a sequence control according to FIG. 17, a tilting of the pelvis 324 is achieved about a tilting axis 325. The two dash-dotted lines 326 illustrate the two opposed maximum tilting positions of the pelvis 324; while the broken line 327 illustrated the center position of the pelvis 324. In the latter case, in only one adjusting element 311$a$ or 311$a$, 311$c$ or 311$d$ is acted upon by pressure on each side.

Figure 18:
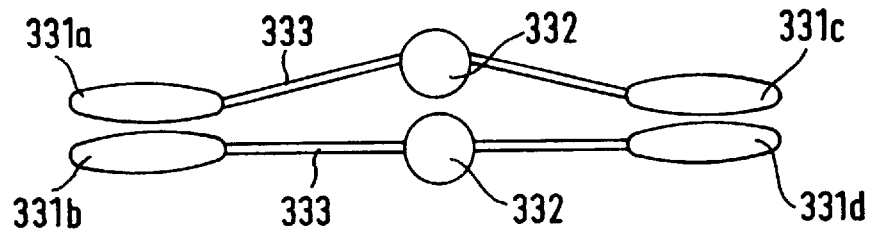
FIG. 18 is a view of an arrangement corresponding to FIG. 16 having two pressure sources.

FIG. 18 illustrates an adjusting device with two separate pressure sources 332, which supplies the adjusting elements 331$a$ to 331$d$ by way of air feeds 333. Each of the pressure sources 332 connects in each case one adjusting element of one seat half with an adjusting element of the other seat half. The two pressure sources 332 operate in an antiphase manner, so that the adjusting elements 331$a,b$ and 331$c,d$ of one seat half respectively are acted upon with pressure in antiphase and, on the whole, a tilting movement is achieved which is illustrated in FIG. 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adjustable seat having a seat cushion and a device for generating a tilting movement of the pelvis of a seat occupant about at least one of a longitudinal center axis and a transverse axis of the seat cushion, which device comprises at least one adjusting element arranged in at least one of right and left sides and forward and rearward areas of the seat cushion; wherein:

the at least one adjusting element comprises at least one pair of adjusting elements;

the respective adjusting elements of said at least one pair comprise means for performing respective adjusting movements in opposite directions, between a lower and an upper position, without an overall upward or downward movement of the seat occupant;

the adjusting elements are expandable members, which are actuatable by filling and emptying with a pressure medium;

the medium is pumped back and forth by a pressure medium pump connected in a medium flow directly between the respective adjusting elements in said pairs according to a continuous predetermined cycle, thereby imparting a cyclic tilting motion to said seat cushion; and said predetermined cycle comprises the following phases starting from a first end position, in which the seat cushion is tilted in a first direction, adjusting said seat cushion in a second direction, opposite the first direction, until a center position is reached, in which the seat cushion is level;

maintaining said seat cushion in the center position for a preset time period;

adjusting said seat cushion farther in the second direction until a second end position is reached in which the seat cushion is tilted in he second direction;

maintaining said second end position for a preset time period; and repeating the previous phases, with movement of the seat cushion in the first direction.

2. The seat according to claim 1, wherein:

the adjusting elements are actuatable by one of a liquid and a gaseous medium.

3. The seat according to claim 1, wherein: the pressure medium pump comprises a sliding vane rotary pump.

4. The seat according to claim 1, wherein:

said pressure medium pump comprises a pump which emits a number of pulses corresponding to a delivered amount of said pressure medium;

said center position is determined by counting a number of pulses generated by said pump during adjustments of said seat cushion between said first and second end positions, and multiplying said number by a predetermined factor, the result being a pulse count indicative of said center position.

5. An adjustable seat having a seat cushion and a device for generating a tilting movement of the seat cushion about a horizontal axis, said device comprising:

at least first and second fluidically actuatable adjusting elements disposed on opposite sides of said horizontal axis, each adjusting element being coupled to said seat and actuatable by fluid pressure to perform upward and downward adjustment movements of the seat cushion;

a fluid line connected to guide a flow of fluid medium in a path between said first and second adjusting elements; and a pressure medium pump connected in said fluid line for pumping said fluid medium between said first and second adjusting elements via said path; wherein the pressure medium pump pumps the fluid medium alternatingly between said first and second adjusting elements according to a continuous predetermined cycle, thereby imparting a cyclic tilting motion to said seat cushion; and said predetermined cycle comprises:
  a pumping period in which fluid medium is pumped between said adjusting elements in a first direction until a center position is reached, in which both adjusting elements are at equal height;
  a center position holding period in which said adjusting elements are maintained in said center position;
  a further pumping period in which fluid medium is again pumped in the first direction until an ending position is reached, in which one of said adjusting elements is completely filled and the other is empty;
  an ending position holding period in which said adjusting elements are maintained in said ending position; and
  corresponding additional periods during which fluid medium is transferred between said adjusting elements in a direction opposite said first direction.

6. The apparatus according to claim 5, wherein:
said pressure medium pump comprises a pump which emits a number of pulses corresponding to a delivered amount of said pressure medium;
said center position is determined by counting a number of pulses generated by said pump during adjustments of said seat cushion between said first and second end positions, and multiplying said number by a predetermined factor, the result being a pulse count indicative of said center position.

7. A method for operating an adjustable seat having a seat cushion and a device for generating a tilting movement of the seat cushion about a horizontal axis, said device having at least first and second fluidically actuatable adjusting elements disposed on opposite sides of said horizontal axis, each adjusting element being coupled to said seat and actuatable by fluid pressure to perform upward and downward adjustment movements of the seat cushion; a fluid line connected to guide a flow of fluid medium in a path between said first and second adjusting elements; and a pressure medium pump connected in said fluid line for pumping said fluid medium between said first and second adjusting elements via said path, said method comprising:
  said fluid pumping fluid medium back and forth between the first and second adjusting elements according to a continuous predetermined cycle, thereby imparting a cyclic tilting motion to said seat cushion; wherein said predetermined cycle comprises:
    a pumping period in which fluid medium is pumped between said adjusting elements in a first direction until a center position is reached, in which both adjusting elements are at equal height;
    a center position holding period in which said adjusting elements are maintained in said center position;
    a further pumping period in which fluid medium is again pumped in the first direction until an ending position is reached, in which one of said adjusting elements is completely filled and the other is empty;
    an ending position holding period in which said adjusting elements are maintained in said ending position; and
  corresponding additional periods during which fluid medium is transferred between said adjusting elements in a direction opposite said first direction.

8. The apparatus according to claim 7, wherein:
said pressure medium pump comprises a pump which emits a number of pulses corresponding to a delivered amount of said pressure medium;
said center position is determined by counting a number of pulses generated by said pump during adjustments of said seat cushion between said first and second end positions, and multiplying said number by a predetermined factor, the result being a pulse count indicative of said center position.

9. A method of operating a vehicle seat having at least first and second fluidically actuated adjusting elements which are disposed approximately symmetrically about a tilting axis of said vehicle seat, for controlling tilting of a seat cushion of said vehicle seat, said method comprising:
  cyclically tilting said seat cushion during occupation of said vehicle seat by a passenger, by causing said adjusting elements to execute oppositely phased movements alternatingly between opposite ending positions, according to a predetermined cycle;
  wherein said predetermined cycle comprises:
    a pumping period in which fluid medium is pumped via a pressure medium pump between said adjusting elements in a first direction until a center position is reached, in which both adjusting elements are at equal height;
    a center position holding period in which said adjusting elements are maintained in said center position;
    a further pumping period in which fluid medium is again pumped in the first direction until an ending position is reached, in which one of said adjusting elements is completely filled and the other is empty;
    an ending position holding period in which said adjusting elements are maintained in said ending position; and
    corresponding additional periods during which fluid medium is transferred between said adjusting elements in a direction opposite said first direction.

10. The method according to claim 9, wherein:
said pressure medium pump comprises a pump which emits a number of pulses corresponding to a delivered amount of said pressure medium;
said center position is determined by counting a number of pulses generated by said pump during adjustments of said seat cushion between said first and second end positions, and multiplying said number by a predetermined factor, the result being a pulse count indicative of said center position.

11. A method for increasing the comfort of a passenger in a vehicle seat, comprising:
  during occupation of said vehicle seat by said passenger, cyclically tilting said vehicle seat about a substantially horizontal tilting axis thereof, back and forth alternatingly between opposite extreme tilted positions, according to a predetermined cycle;
  wherein said predetermined cycle comprises the following phases:
    starting from a first end position, in which the seat cushion is fully tilted in a first direction, adjusting said seat cushion in a second direction, opposite the first direction, until a center position is reached, in which the seat cushion is level;
    maintaining said seat cushion in the center position for a preset time period;
    adjusting said seat cushion farther in the second direction until a second end position is reached in which the seat cushion is fully tilted in the second direction;
    maintaining said second end position for a preset time period; and
    repeating the previous phases, with movement of the seat cushion in the first direction.

* * * * *